Nov. 22, 1949     H. L. MORRIS     2,488,874
OIL ENGINE
Filed April 14, 1945
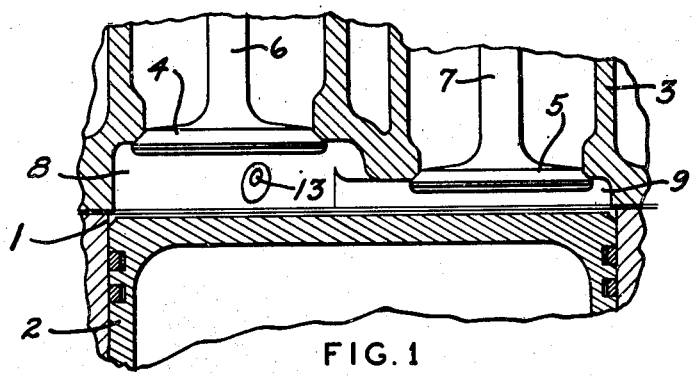
FIG. 1
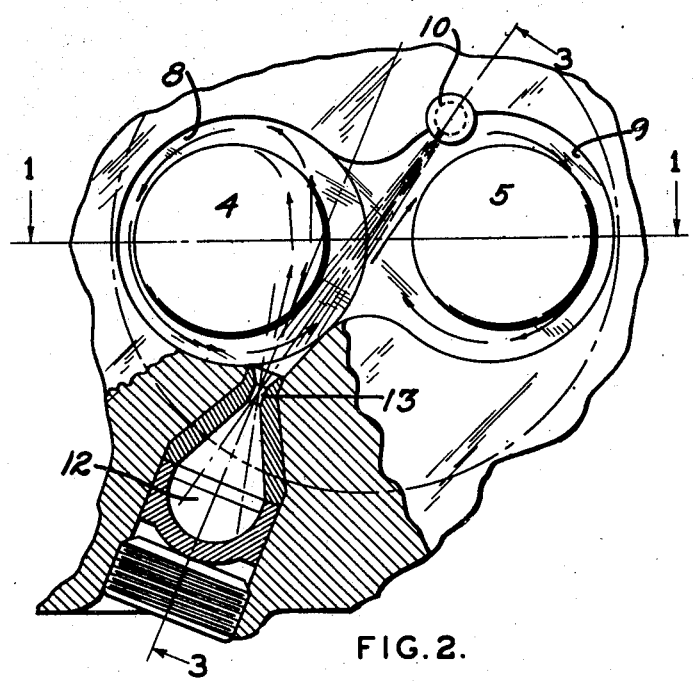
FIG. 2.
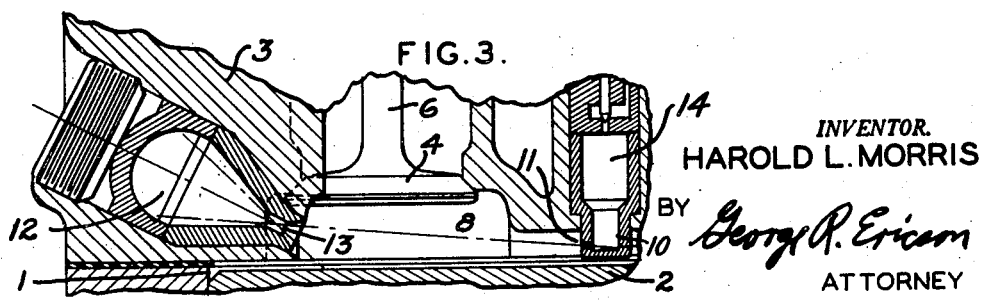
INVENTOR.
HAROLD L. MORRIS
BY George R. Ericsen
ATTORNEY Patented Nov. 22, 1949

2,488,874

UNITED STATES PATENT OFFICE 2,488,874

OIL ENGINE

Harold L. Morris, Berkeley, Calif., assignor of one-half to George R. Ericson, Kirkwood, Mo.

Application April 14, 1945, Serial No. 588,283

3 Claims. (Cl. 123—32)

This invention relates to oil engines, and particularly to oil engines of the type operating by self-ignition and having an auxiliary combustion chamber. Previous engines of this type have not been entirely satisfactory for the reason that it has been difficult or impossible to reduce the volume of the combustion chamber sufficiently to obtain a satisfactory compression ratio without bringing the tip of the injection nozzle too close to the mouth of the auxiliary combustion chamber. This is particularly true in engines having cylinder bores of six inches or less in diameter, and the difficulty is aggravated in engines in which the valve timing is arranged to provide some overlap at the end of the exhaust stroke. The reason for these difficulties is that for compression ratios in the order of 16 to 1, the valves must be arranged in the head of the cylinder so as to open directly toward and into that part of the cylinder which is swept by the piston, and therefore the valves cannot be in a fully opened position at the time when the piston is at top dead center. Attempts have been made to solve this difficulty by filling up the volume of the cylinder head around the valves as closely as possible and placing the fuel nozzle and air cell at the constriction of the resulting figure 8 shaped chamber, but such heads are not entirely satisfactory for small bore engines because the mouth of the auxiliary combustion chamber is too close to the cooled wall just opposite and the blast is cooled and dissipated before it has time to burn completely.

It is an object of my invention to provide a new and improved combustion chamber in which the compression ratio may be increased to substantially 16 to 1, in which the valve timing necessary for high speed operation and supercharging can be obtained, and in which the correct spacing of the fuel nozzle and the auxiliary combustion chamber can be obtained.

Other objects and advantages of my invention will be apparent upon consideration of the following description and accompanying drawings, referring to which:

Figure 1 is a vertical sectional view of a combustion chamber embodying the principles of my invention, the view being taken in a plane parallel to the axis of the crankshaft of a multi-cylinder in line engine, along the line 1—1 of Figure 2.

Figure 2 is an inverted plan view of the cylinder head with parts broken away and others shown in section, and Figure 3 is a vertical sectional view taken along the line 3—3 of Figure 2.

The reference numeral 1 indicates the cylinder of an engine having a piston 2 and a detachable cylinder head generally indicated by the reference numeral 3. The cylinder head is provided with an exhaust valve 4 and an inlet valve 5, having stems 6 and 7 respectively, which are operated by any suitable means, not shown but well known in the art. The exhaust valve is located in a pocket 8 which is substantially cylindrical or slightly frusto-conical, as desired, and the inlet valve is placed in a similar adjacent pocket 9 which is of less depth than pocket 8 and has only sufficient depth to permit the valve to move to partly open position while the piston is at the top of its stroke. A recess or throat 30 is formed in the inner face of the cylinder head and connects the pockets. Similar walls 31 forming the throat sides curve toward each other from each end so that the greatest restriction in the throat is midway of its length. The depth of the throat corresponds to and lies in the same plane with pocket 9. A fuel nozzle 10 having a discharge opening 11 is mounted in the cylinder head in such a manner that the discharge opening opens into pocket 9 at one side of throat 30 and the opening 11 is directed to discharge fuel diagonally across the throat between the valve pockets 8 and 9, in such a manner as to send its stream of fuel or fuel spray into the mouth of the supplementary combustion chamber 12 in pocket 8 at the other side of the throat. The mouth of chamber 12 is directed to discharge into valve pocket 8, for the purpose of creating the most efficient turbulence, and avoiding contact of the hottest portion of the blast with the cooled walls of the combustion chamber.

By mounting the auxiliary combustion chamber 12 in the manner described it is possible to find sufficient space in the wall of the pocket 8 to insert an air chamber having a mouth of sufficient size to receive a proper proportion of fuel sprayed from the nozzle 10 across the throat 30. This is because the auxiliary combustion chamber is mounted in the deeper pocket, while the fuel nozzle is mounted in the other pocket. Also by the arrangement described the axis of the auxiliary combustion chamber may be kept more nearly horizontal and parallel with the top of the piston than would be possible if the valve pockets were of the same depth, it being noted that the outer end or mouth of the pre-combustion chamber must be considerably larger than the discharge outlet 13.

I prefer to use a nozzle 10 of the pre-combustion chamber type, such as shown in the patent to Thomas No. 2,071,241, issued February 16, 1937, in which the preliminary combustion occurs in the chamber 14, thus serving to discharge the fuel from the orifice 11 with greater velocity. It will be understood, however, that a plain nozzle without the pre-combustion chamber 14 may be used if desired.

I claim:

1. In a fuel injection engine, a cylinder, a piston in the cylinder, a cylinder head having a combustion chamber above the piston formed by an inlet valve pocket, an exhaust valve pocket and a throat connecting the pockets, said inlet valve pocket and said throat being formed more shallow than the exhaust pocket, a fuel nozzle having a discharge outlet opening into the inlet valve pocket at a point adjacent the junction of the throat and inlet valve pocket, and an auxiliary combustion chamber arranged at the opposite side of the head from the fuel nozzle and opening to the exhaust valve pocket adjacent the throat, the axis of discharge of the opening of said auxiliary chamber being arranged in line with the axis of discharge of the nozzle discharge outlet and directed to discharge into said exhaust valve pocket.

2. In a fuel injection engine, a cylinder, a piston in the cylinder, a cylinder head having a combustion chamber above the piston formed by an inlet valve pocket, an exhaust valve pocket and a throat connecting the pockets, a fuel nozzle mounted in the inlet valve pocket adjacent the throat, and an auxiliary combustion chamber in the head on the opposite side of the throat from the nozzle and having an opening directed to discharge into the exhaust pocket, said nozzle opening being arranged to discharge fuel diagonally across the throat into the auxiliary chamber opening in the exhaust valve pocket.

3. In a fuel injection engine, a cylinder, a piston in the cylinder, a cylinder head having a combustion chamber above the piston formed by an inlet valve pocket, an exhaust valve pocket and a restricted throat connecting the pockets, said inlet valve pocket and said throat being formed more shallow than the exhaust pocket, a fuel nozzle mounted in the inlet valve pocket adjacent the throat, and an auxiliary combustion chamber opening into the exhaust chamber pocket adjacent the throat diagonally across the chamber from the nozzle, said auxiliary chamber opening being arranged to receive fuel in a direct line from the nozzle outlet and to discharge into the foil of said exhaust valve pocket.

HAROLD L. MORRIS.

REFERENCES CITED

The following references are of record in the file of this patent:

UNITED STATES PATENTS

| Number | Name | Date |
|---|---|---|
| 1,954,084 | Lang | Apr. 10, 1934 |
| 2,080,139 | Lang | May 11, 1937 |
| 2,267,418 | Oldberg et al. | Dec. 23, 1941 |
| 2,281,685 | Fischer | May 5, 1342 |

FOREIGN PATENTS

| Number | Country | Date |
|---|---|---|
| 315,162 | Great Britain | July 11, 1929 |